United States Patent
Sengupta

(10) Patent No.: US 7,908,291 B2
(45) Date of Patent: Mar. 15, 2011

(54) TECHNIQUE FOR CREATING SELF DESCRIBED DATA SHARED ACROSS MULTIPLE SERVICES

(75) Inventor: Somenath Sengupta, Edison, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 552 days.

(21) Appl. No.: 11/054,882

(22) Filed: Feb. 10, 2005

(65) Prior Publication Data

US 2006/0155722 A1    Jul. 13, 2006

Related U.S. Application Data

(60) Provisional application No. 60/642,019, filed on Jan. 7, 2005.

(51) Int. Cl.
G06F 7/00 (2006.01)
G06F 17/30 (2006.01)
G06F 15/16 (2006.01)

(52) U.S. Cl. .......................... 707/782; 707/781; 709/236

(58) Field of Classification Search ............... 707/2, 10, 707/100, 102
See application file for complete search history.

(56) References Cited

U.S. PATENT DOCUMENTS

| | | | | |
|---|---|---|---|---|
| 5,251,205 A * | 10/1993 | Callon et al. | ................. | 370/392 |
| 5,926,810 A * | 7/1999 | Noble et al. | ..................... | 707/4 |
| 6,505,200 B1 * | 1/2003 | Ims et al. | ..................... | 707/638 |
| 6,549,935 B1 * | 4/2003 | Lapstun et al. | ................ | 709/204 |
| 6,643,652 B2 * | 11/2003 | Helgeson et al. | ................ | 707/10 |
| 6,665,659 B1 * | 12/2003 | Logan | ................ | 707/3 |
| 2002/0178164 A1 * | 11/2002 | Wisniewski | ................ | 707/10 |
| 2003/0120651 A1 * | 6/2003 | Bernstein et al. | ................ | 707/6 |
| 2004/0088430 A1 * | 5/2004 | Busi et al. | ..................... | 709/238 |

OTHER PUBLICATIONS

"Internet Protocol: DARPA Internet Program Protocol Specification", Information Sciences Institute, Sep. 1981.*

* cited by examiner

Primary Examiner — Tim T. Vo
Assistant Examiner — Garrett Smith
(74) Attorney, Agent, or Firm — Fliesler Meyer LLP

(57) ABSTRACT

In accordance with one embodiment of the present invention, there are provided mechanisms and methods for sharing data across services. These mechanisms and methods for applications to share information even when the applications use different data formats make it possible for business services to operate without any disruption even if the input data stream produced by it's peer business service has been changed.

8 Claims, 6 Drawing Sheets

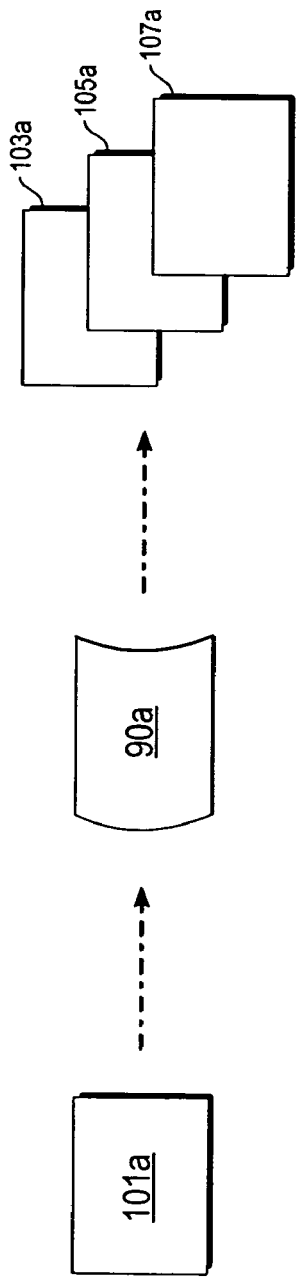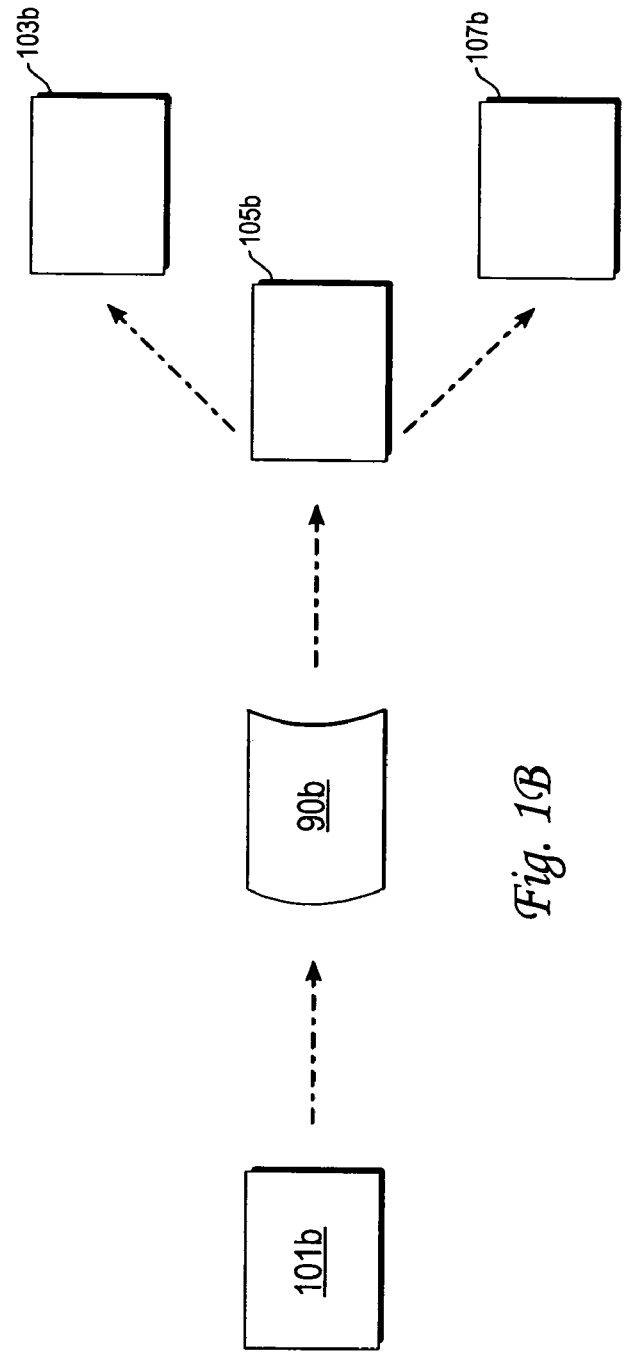

TECHNIQUE FOR CREATING SELF DESCRIBED DATA SHARED ACROSS MULTIPLE SERVICES

CLAIM OF PRIORITY

This application claims the benefit of a U.S. Provisional Patent Application 60/642,019 entitled A TECHNIQUE FOR CREATING SELF DESCRIBED DATA SHARED ACROSS MULTIPLE SERVICES, by Somenath Sengupta, filed Jan. 7, 2005, the entire contents of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to data exchange between applications, and more particularly to a mechanism for creating self-described data that may be shared across multiple services.

BACKGROUND

Today's enterprise computing systems face increasing demands for existing applications, either within a single enterprise or across multiple enterprises, to work with one another. One challenge involved with the data shared across applications is how multiple parties can adapt to the changes in format and/or semantics of the shared data. Presently, one or more factors block successful interaction between applications. These factors include different interaction semantics and different data formats and semantics among different applications.

Currently available techniques do not solve the problem of differences in data formats and data semantics in a dynamic manner. Many current approaches employ adapters to enable each application to communicate with the other applications. Such conventional approaches require each party to the conversation to have pre-existing knowledge about data definitions of peer parties. In such conventional approaches, changing any one of the parties to a communication necessitates changes to the adapters used by each of the other parties.

BRIEF DESCRIPTION OF THE DRAWINGS

FIGS. 1A -1B are functional block diagrams of example computing environments in which techniques for sharing data across services in one embodiment of the present invention may be implemented.

DETAILED DESCRIPTION

Figure 2A:
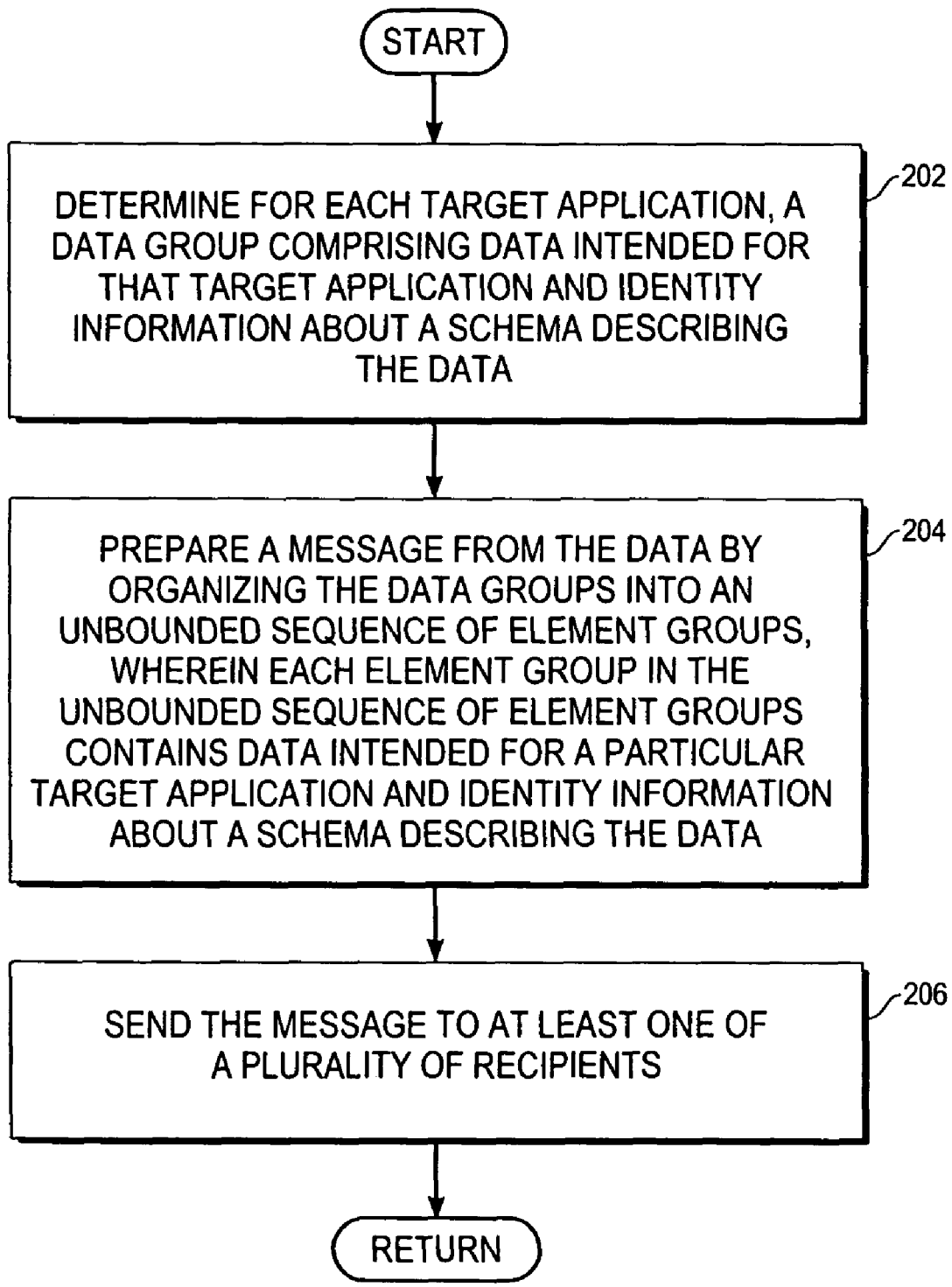
FIG. 2A is an operational flow diagram illustrating a high level overview of a technique for sharing data in one embodiment of the present invention.

In accordance with one embodiment of the present invention, there are provided mechanisms and methods for sharing data across services. These mechanisms and methods for applications to share information even when the applications use different data formats make it possible for business services to operate without any disruption even if the input data stream produced by it's peer business service has been changed.

In one embodiment, the invention provides a method for sharing data. One embodiment of the method includes determining a data group for each target application. The data group includes data intended for that target application and identity information about a schema describing the data. A message is prepared from the data by organizing the data groups into a plurality of element groups. In one embodiment, the plurality of element groups is implemented by an unbounded sequence of element groups, however other implementations are contemplated. Each element group in the plurality of element groups contains data intended for a particular target application and identity information about a schema describing the data. The message is sent to at least one of a plurality of recipients.

The mechanisms and methods for sharing data across services even when the applications use different data formats enable business service applications to operate without any disruption even if the input data stream produced by it's peer business service application has been changed. The data sharing techniques provided by one embodiment enable a multiparty communication scenario to continue working even when one or more subscribers want a different set of information from the other subscribers. In one embodiment, a message producer does not have to have pre-existing knowledge of supported data format or semantics of each individual subscriber. In one embodiment, a technique supports strong type validations.

In one embodiment, business service applications may be constrained to only see the portion of the data for which that business service is authorized, even though the producer of the data publishes the message once to a plurality of business services. In one embodiment, the producer of the data can change the data without breaking any subscriber. In one embodiment, each business service can route the data to another service even though the service itself only understands a portion of the data. In one embodiment, if a business service broadcasts the data to a group of business services in which each member of the group of business services understands a different data description language, a message having a set of sub-divided portions described with different languages and conformed to different schema enables the sender to send the same data only once to a group of subscribers.

This ability of a multiparty communication scenario to continue working even when one or more subscribers want a different set of information from the other subscribers makes it possible to attain improved usage from computing resources in a computer system.

FIGS. 1A-1B are functional block diagrams of example computing environments in which techniques for sharing data across services in one embodiment of the present invention may be implemented. As shown in FIG. 1A, an application 101a is sending a message 90a to a plurality of applications 103a, 105a and 107a. Applications 101a, 103a, 105a and 107a may be any kind of business services, data processing services, data storage and retrieval services, web hosting services, scientific applications, entertainment applications and other application types that are contemplated. While FIG. 1A depicts application 101a as a message sender and applications 103a, 105a and 107a as message recipients, or target applications, in many embodiments, communications between applications will be bi-directional. Communications between applications 101a, 103a, 105a and 107a can be facilitated by a variety of mechanisms in various embodiments, such as, without limitation, computer networks, wireless networks, direct memory interfaces and other communications mechanisms comprised of hardware, software and combinations thereof, that are contemplated.

Message 90a comprises one or more individual element groups, each element group includes data to be exchanged between application 101a and one of applications 101a, 103a, 105a and 107a. Message 90a may contain data that is structured or semi-structured. Application 101a processes data into the element groups for one or more of the applications 103a, 105a and 107a using processing described in further detail below with reference to FIGS. 2A-2D. Each element group in message 90a includes information relating to a schema for the element group. Including information identifying a schema for the data makes the data self-described. Accordingly, message 90a is an unbounded sequence of elements, each element of which may have sub-elements, and for which there is no one single schema for the whole of the data stored in message 90a. By employing such processing techniques, applications 101a, 103a, 105a and 107a are able to operate in a loosely coupled environment, meaning that a change to any one application does not necessitate changes to each of the other applications. While FIG. 1A illustrates a communication process in which application 101a broadcasts a message 90a to a plurality of recipient applications 101a, 103a, 105a and 107a, other communications configurations are also possible.

FIG. 1B illustrates another communications configuration in which sender application 101b sends a message 90b to a recipient application 105b. Application 105b may then pass the message 90b on to other recipient applications 103b and 107b. In such case, application 105b may act as both a receiving application and a sending application in certain embodiments. Many other communications configurations between applications 101a, 103a, 105a and 107a are readily apparent to one skilled in the art. While the invention is illustrated generally herein with reference to an example of devices using a Java™ Virtual Machine (JVM) as the runtime environment, the present invention does not require such an environment, and in some embodiments, techniques according to the invention may be implemented in devices using alternative runtime environments.

FIG. 2A is an operational flow diagram illustrating a high level overview of a technique for sharing data in an embodiment of the present invention. The technique for sharing data shown in FIG. 2A is operable with an application sending data, such as application 101a of FIG. 1A and application 101b of FIG. 1B, for example. As shown in FIG. 2A, a data group is determined for each target application (block 202).

Each data group comprises data intended for a particular target application and identity information about a schema describing the data. A message is prepared by organizing the data groups into an unbounded sequence of element groups (block 204). Each element group in the unbounded sequence of element groups contains the data intended for a particular target application and the identity information about a schema describing the data. The message is sent to at least one of a plurality of recipients (block 206).

Figure 2B:
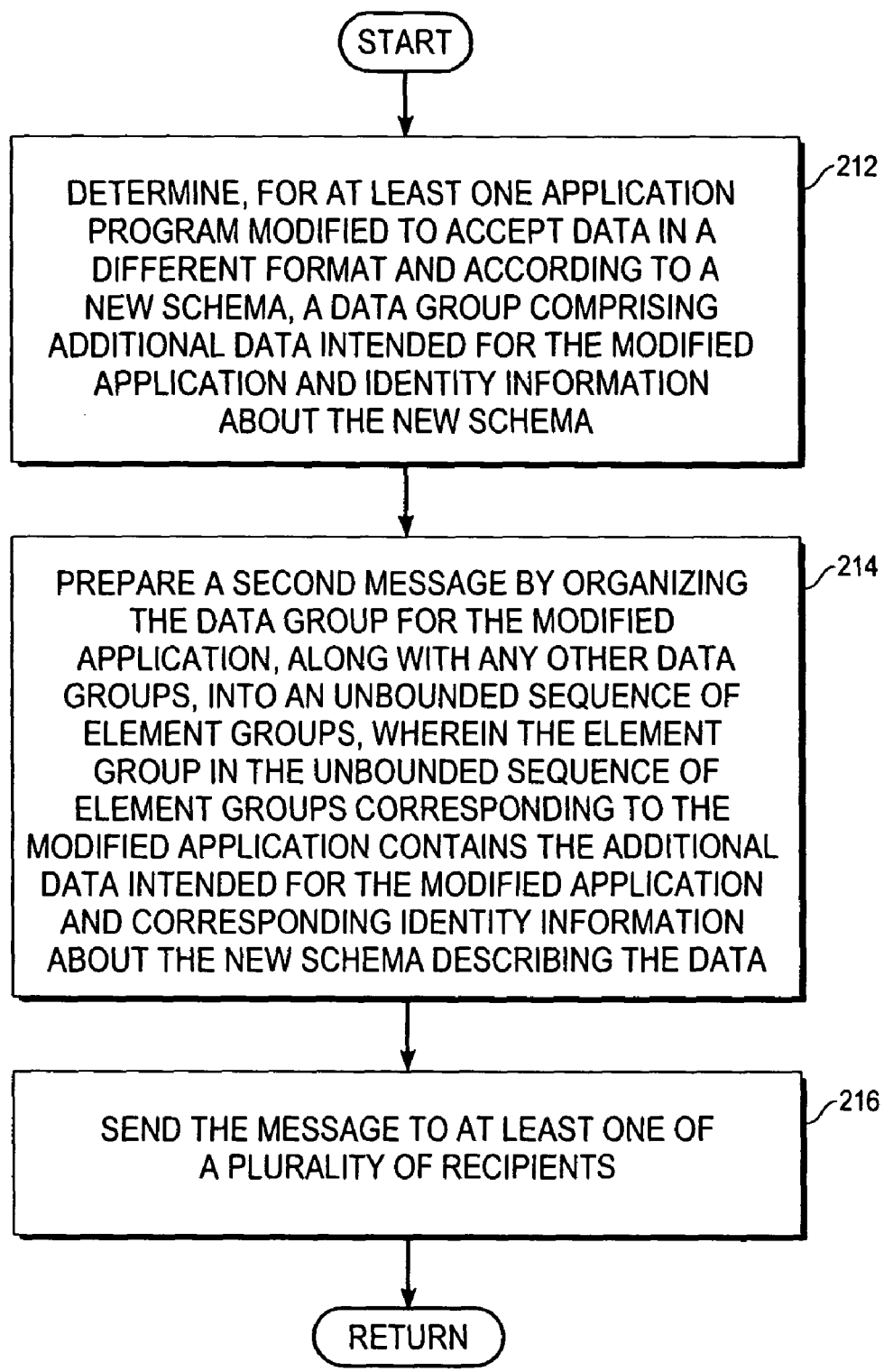
FIG. 2B is an operational flow diagram illustrating a high level overview of a technique for sharing data when an application has been modified in one embodiment of the present invention.

FIG. 2B is an operational flow diagram illustrating a high level overview of a technique for sharing data when an application has been modified in one embodiment of the present invention. The technique for sharing data shown in FIG. 2B is operable with an application sending data, such as application 101a of FIG. 1A and application 101b of FIG. 1B, for example. As shown in FIG. 2B, a data group is determined for at least one application program that has been modified to accept data in a different format and according to a new schema (block 212). The data group comprises additional data intended for the modified application and identity information about the new schema. A second message is prepared by organizing the data group for the modified application, along with any other data groups, into an unbounded sequence of element groups (block 214). The element group in the unbounded sequence of element groups that corresponds to the modified application contains the additional data intended for the modified application and corresponding identity information about the new schema describing the data. The message is sent to at least one of a plurality of recipients (block 216). In one embodiment, the processing illustrated by FIG. 2B enables the modified application to receive data in a new format irrespective of data groups intended for other applications.

Figure 2C:
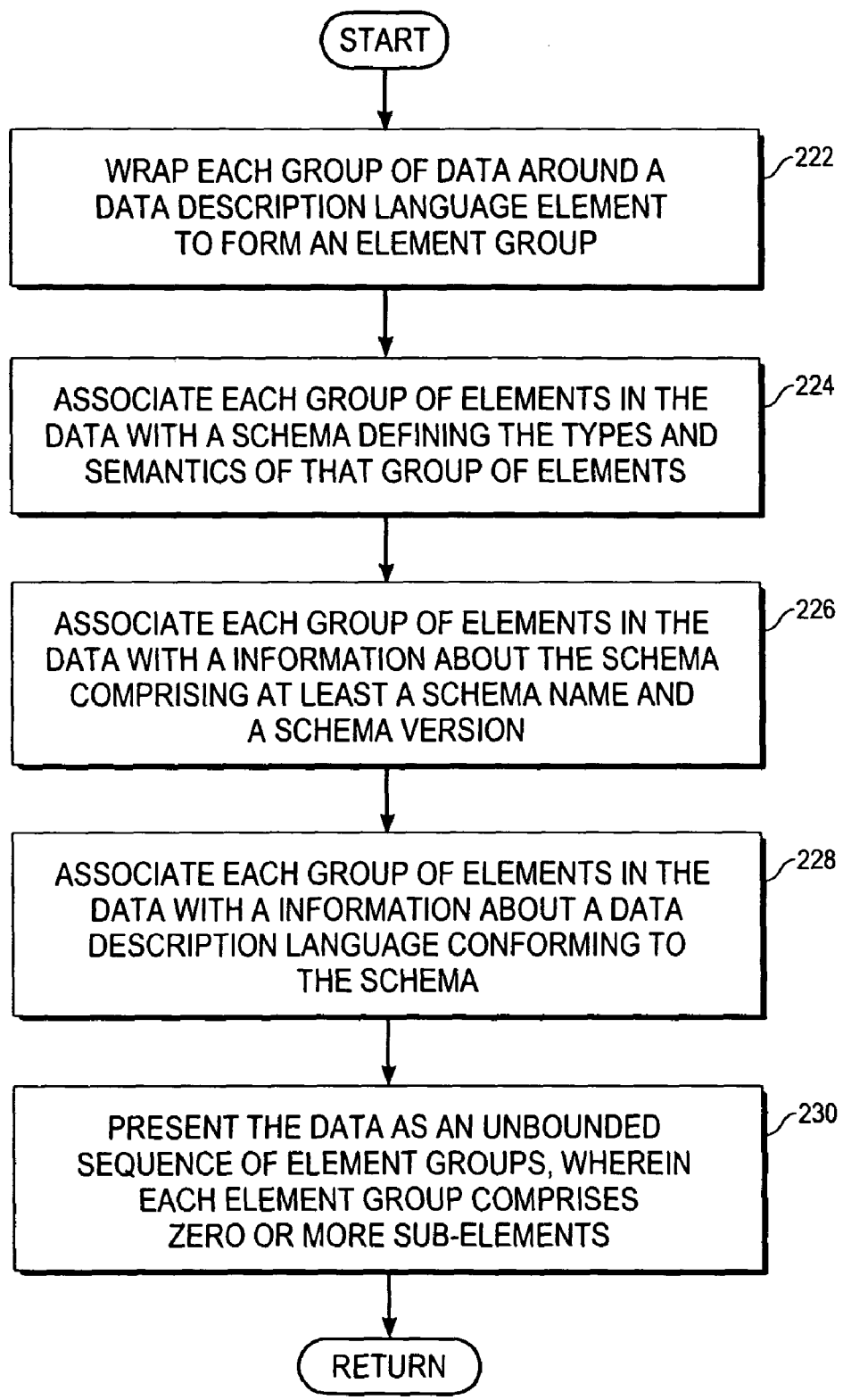
FIG. 2C is an operational flow diagram illustrating a high level overview of a technique for defining data in one embodiment of the present invention.

FIG. 2C is an operational flow diagram illustrating a high level overview of a technique for defining data in one embodiment of the present invention. The technique for sharing data shown in FIG. 2C is operable with an application sending data, such as application 101a of FIG. 1A and application 101b of FIG. 1B, for example. As shown in FIG. 2C, each group of elements is wrapped around a data description language element, e.g. <newElements> (block 222). Data description languages that may be used in various embodiments include, for example eXtended Markup Language (XML), Resource Description Framework (RDF) and other formats are also contemplated. Next, each group of elements used in the data is associated with a schema defining the types and semantics of that group of elements (block 224). Each group of elements used in the data is associated with the information about the schema name and the schema version and the like (block 226). Each group of elements used in the data is associated with the information about the well-known data description language conforming to the schema (block 228). The data is presented as an unbounded sequence of elements where each element itself may have sub-elements (block 230). In the embodiment illustrated by FIG. 2C, there is no one schema for the whole data.

Figure 2D:
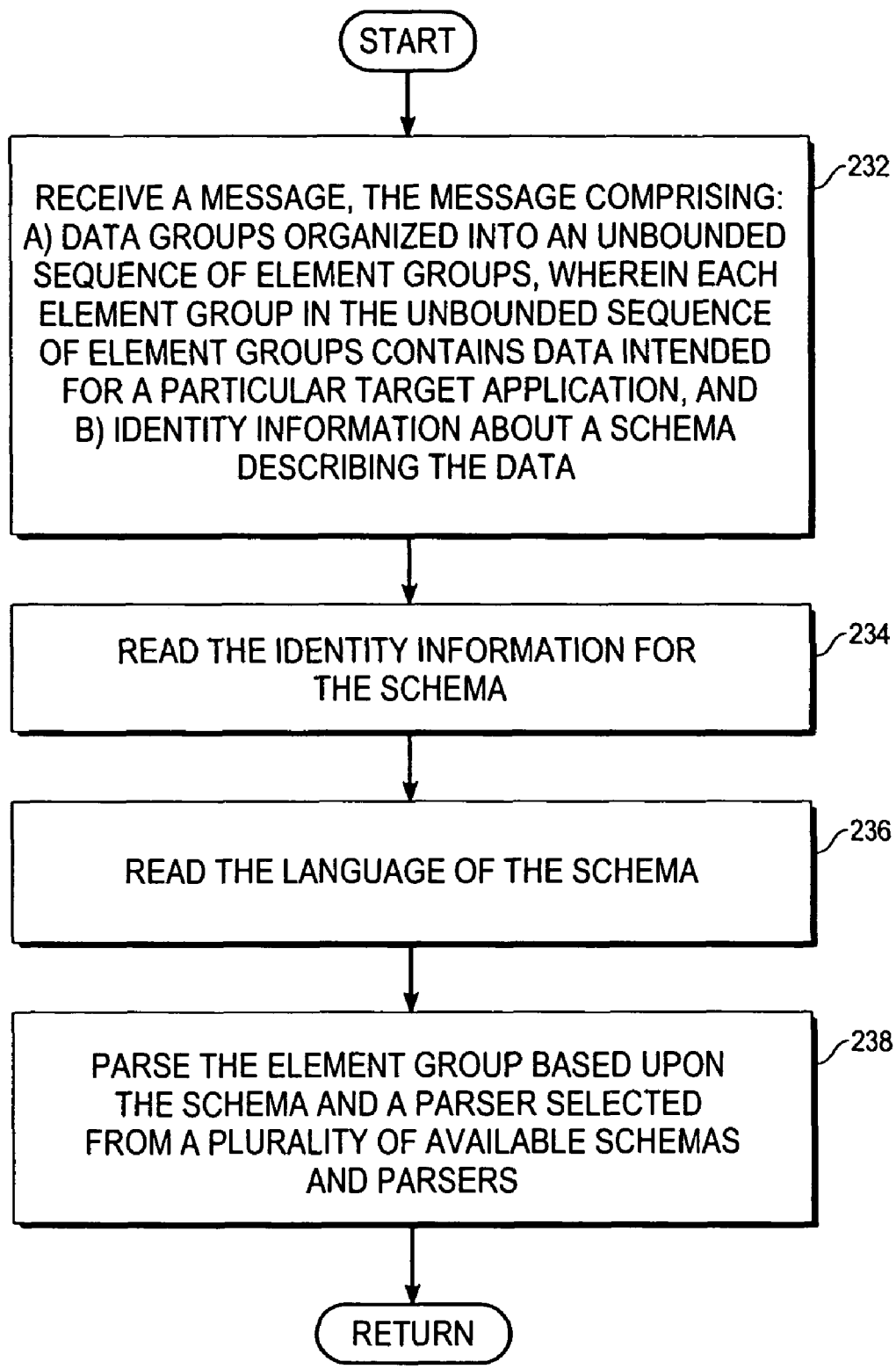
FIG. 2D is an operational flow diagram illustrating a high level overview of a process for reading data from the conforming schema in one embodiment of the present invention.

FIG. 2D is an operational flow diagram illustrating a high level overview of a process for reading data from the conforming schema in one embodiment of the present invention. As shown in FIG. 2D, a message is received (block 232). The technique for reading data shown in FIG. 2D is operable with an application receiving data, such as applications 103a, 105a and 107a of FIG. 1A and applications 103b, 105b and 107b of FIG. 1B, for example. The message comprises data groups organized into an unbounded sequence of element groups. Each element group in the unbounded sequence of element groups contains data intended for a particular target application. The message also includes identity information about a schema describing the data. Information identifying the schema is read (block 234). Information identifying the schema may include, a schema name, a schema version and other identification forms are contemplated. Next, the schema language is read (block 236). The group of elements is parsed (block 238) based upon an appropriate combination of schema and parsers selected from a plurality of available schemas and parsers (e.g. if schema language is RDF, an RDF parser is selected).

The technique illustrated by FIG. 2D does not enforce each business service participating in a conversation to comply with this mechanism. Rather, in the illustrated embodiment, each business service can internally use any schema, but just before sharing it with other parties, the business service transforms the message to a common format such as without limitation the format illustrated below. Accordingly, this embodiment provides an extendable format for data that accommodates changes in the data structures shared across multiple parties.

In one embodiment, the data structure for each group of elements is XML that conforms to the following schema:

```
<?xml version="1.0" encoding="UTF-8"?>
<xs:schema xmlns:xs="http://www.w3.org/2001/XMLSchema"
elementFormDefault="qualified" attributeFormDefault="unqualified">
    <xs:complexType name="buildingBlocks">
      <xs:sequence>
        <xs:element name ="schemaName" type ="xs:string"/>
        <xs:element name= "schemaVersion" type ="xs:string"/>
        <xs:element name= "schemaLanguage" type ="xs:string"/>
        <xs:element name= "schemaDef" type = "xs:base64Binary"/>
        <xs:element name="body" type ="xs:anyType"/>
      </xs:sequence>
    </xs:complexType>
    <xs:element name="NewElements">
        <xs:complexType>
            <xs:sequence>
    <xs:element name="NewElement" type ="buildingBlocks"
maxOccurs="unbounded" minOccurs="0" />
            </xs:sequence>
        </xs:complexType>
    </xs:element >
</xs:schema>
```

Example of the data instance conforming to this schema:

```
<NewElements>
<NewElement>
<schemaName>Schema1.xsd</schemaName>
<schemaVersion>1</schemaVersion>
<schemaLanguage>xml</ schemaLanguage >
  <schemaDef>base64 encoded schema content</schemaDef>
<body>
..... xml structure
</body>
</NewElement>
<NewElement>
<schemaName>Schema2.xsd</schemaName>
<schemaVersion>1</schemaVersion>
<schemaLanguage>rdf</schemaLanguage >
<schemaDef> base64 encoded schema content</schemaDef>
<body>
..... rdf structure
</body>
</NewElement>
.............
</NewElements>
```

Example of the updated data instance still conforming to this schema:

```
<NewElements>
<NewElement>
<schemaName>Schema1.xsd</schemaName>
<schemaVersion>1</schemaVersion>
<schemaLanguage>xml</schemaLanguage >
<schemaDef>base64 encoded schema content</schemaDef>
<body>
..... xml structure
</body>
</NewElement>
<NewElement>
<schemaName>Schema2.xsd</schemaName>
<schemaVersion>1</schemaVersion>
<schemaLanguage>rdf</schemaLanguage >
<schemaDef>base64 encoded schema content</schemaDef>
<body>
..... rdf srtucture
</body>
</NewElement>
<NewElement>
<schemaName>Schema3.xsd</schemaName>
<schemaVersion>1</schemaVersion>
<schemaLanguage>rdf</schemaLanguage >
<schemaDef>base64 encoded schema content</schemaDef>
<body>
..... rdf structure
</body>
</NewElement>
</NewElements>
```

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for sharing data as discussed herein.

Figure 3:
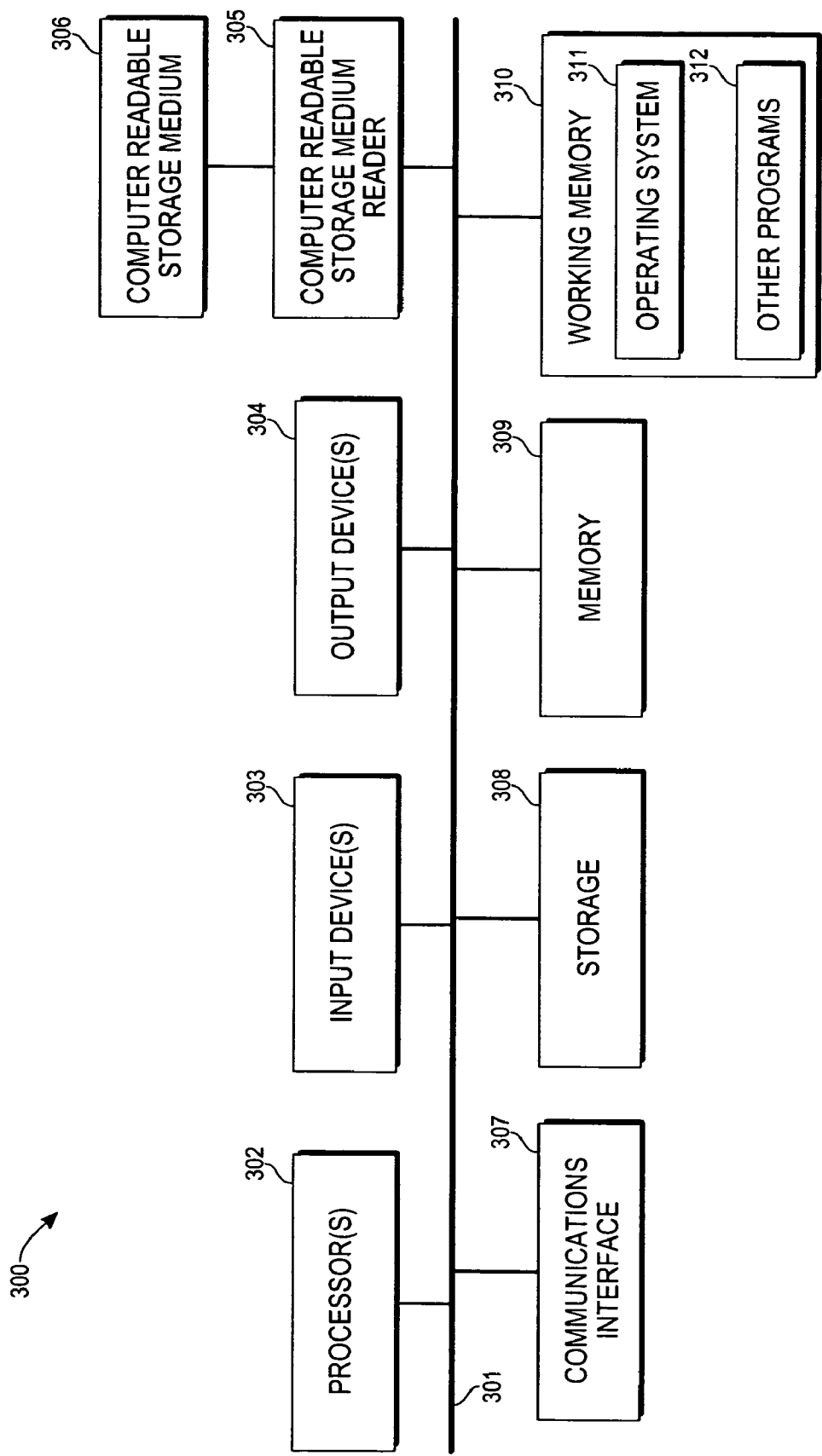
FIG. 3 is a hardware block diagram of an example computer system, which may be used to embody one or more components of an embodiment of the present invention.

FIG. 3 illustrates an exemplary processing system 300, which can comprise one or more of the elements of FIGS. 1A and 1B. Turning now to FIG. 3, an exemplary computing system is illustrated that may comprise one or more of the components of FIGS. 1A and 1B. While other alternatives might be utilized, it will be presumed for clarity sake that components of the systems of FIGS. 1A and 1B are implemented in hardware, software or some combination by one or more computing systems consistent therewith, unless otherwise indicated.

Computing system 300 comprises components coupled via one or more communication channels (e.g., bus 301) including one or more general or special purpose processors 302, such as a Pentium®, Centrino®, Power PC®, digital signal processor ("DSP"), and so on. System 300 components also include one or more input devices 303 (such as a mouse, keyboard, microphone, pen, and so on), and one or more output devices 304, such as a suitable display, speakers, actuators, and so on, in accordance with a particular application. (It will be appreciated that input or output devices can also similarly include more specialized devices or hardware/software device enhancements suitable for use by the mentally or physically challenged.)

System 300 also includes a computer readable storage media reader 305 coupled to a computer readable storage medium 306, such as a storage/memory device or hard or removable storage/memory media; such devices or media are further indicated separately as storage 308 and memory 309, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 307 may also be included, such as a modem, DSL, infrared, RF or other suitable transceiver, and so on for providing inter-device communication directly or via one or more suitable private or public networks or other components that may include but are not limited to those already discussed.

Working memory 310 further includes operating system ("OS") 311 elements and other programs 312, such as one or more of application programs, mobile code, data, and so on for implementing system 300 components that might be stored or loaded therein during use. The particular OS or OSs may vary in accordance with a particular device, features or other aspects in accordance with a particular application (e.g. Windows®, WindowsCE®, Mac®, Linux, Unix or Palm OS® variants, a cell phone OS, a proprietary OS, Symbian®, and so on). Various programming languages or other tools can also be utilized, such as those compatible with C variants (e.g., C++, C#), the Java 2™ Platform, Enterprise Edition ("J2EE™") or other programming languages in accordance with the requirements of a particular application. Other programs 312 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 308 or memory 309) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for sharing data across a plurality of services, the method comprising:

determining, by a processor of a message producer, data to be sent from said message producer to a plurality of recipient applications;

defining, by the processor of the message producer, an extensible markup language (XML) schema that specifies an unbounded sequence of elements, wherein the unbounded sequence is extendable by adding new elements irrespective of existing elements in the unbounded sequence, wherein each element in the XML schema comprises a body of data and wherein each said element further identifies at least one schema used to process the body of data of said element;

composing, by the processor of the message producer, a single message that conforms to the XML schema, wherein said processor of the message producer organizes the data to be sent to the plurality of recipient applications as the sequence of said elements, each said element being intended for a particular recipient application and each said element identifying the schema intended for the particular recipient application;

broadcasting, by the processor of the message producer, the single message from the message producer to the plurality of different recipient applications, each recipient application using a different data description language, wherein said each recipient application processes only the portion of the single message that contains the element intended for said recipient application by retrieving the schema associated with said element;

determining, by the processor of the message producer, that at least one of the plurality of recipient applications has been modified to use a new data description language and receiving additional data to be transmitted to the modified recipient application, wherein said new data description language is unsupported by the XML schema;

modifying, by the processor of the message producer, the XML schema to include said new data description language by including a new element that extends the unbounded sequence of elements of the XML schema, wherein the new element identifies a new schema that defines the types and semantics of the additional data contained in the new element and is compatible with said new data description language of said modified recipient application;

creating, by the processor of the message producer, a second message that conforms to the extended XML schema, said second message including the additional data as said new element, wherein said new element describes said new schema and is compatible with said new data description language of said modified recipient application;

broadcasting, by the processor of the message producer, the second message to the modified recipient and to the plurality of the recipient applications, wherein the plurality of recipient applications remain unaffected by the extension of the second message to include the new element and the new schema, wherein the modified recipient processes the new element of the second message by retrieving the new schema, and wherein each of the recipient applications receives the second message and processes only a portion of the elements of the second message that are intended for the particular recipient application; and creating and broadcasting, by the processor of the message producer, one or more additional messages conforming to the extended XML schema to the plurality of recipient applications.

2. The method of claim 1, wherein composing the single message that conforms to the XML schema further comprises:
associating each element of the single message with a schema name and a schema version;
associating each element of the single message with a schema definition; and
presenting the data as the unbounded sequence of elements.

3. A computer-readable storage medium including instructions stored thereon which when read and executed by one or more processors of a message producer cause the one or more processors to perform steps comprising:
determining data to be sent from said message producer to a plurality of recipient applications;
defining an extensible markup language (XML) schema that specifies an unbounded sequence of elements, wherein the unbounded sequence is extendable by adding new elements irrespective of existing elements in the unbounded sequence, wherein each element in the XML schema comprises a body of data and wherein each said element further identifies at least one schema used to process the body of data of said element;
composing a single message that conforms to the XML schema, wherein said one or more processors of the message producer organizes the data to be sent to the plurality of recipient applications as the sequence of said elements, each said element being intended for a particular recipient application and each said element identifying the schema intended for the particular recipient application;
broadcasting the single message from the message producer to the plurality of different recipient applications, each recipient application using a different data description language, wherein said each recipient application processes only the portion of the single message that contains the element intended for said recipient application by retrieving the schema associated with said element;
determining that at least one of the plurality of recipient applications has been modified to use a new data description language and receiving additional data to be transmitted to the modified recipient application, wherein said new data description language is unsupported by the XML schema;
modifying the XML schema to include said new data description language by including a new element that extends the unbounded sequence of elements of the XML schema, wherein the new element identifies a new schema that defines the types and semantics of the additional data contained in the new element and is compatible with said new data description language of said modified recipient application;
creating a second message that conforms to the extended XML schema, said second message including the additional data as said new element, wherein said new element describes said new schema and is compatible with said new data description language of said modified recipient application;
broadcasting the second message to the modified recipient and to the plurality of the recipient applications, wherein the plurality of recipient applications remain unaffected by the extension of the second message to include the new element and the new schema, wherein the modified recipient processes the new element of the second message by retrieving the new schema, and wherein each of the recipient applications receives the second message and processes only a portion of the elements of the second message that are intended for the particular recipient application; and
creating and broadcasting one or more additional messages conforming to the extended XML schema to the plurality of recipient applications.

4. The computer-readable storage medium of claim 3, wherein composing the single message that conforms to the XML schema further includes:
associating each element of the single message with a schema name and a schema version;
associating each element of the single message with a schema definition; and presenting the data as the unbounded sequence of elements,
associating each group of elements in the data with a schema name and a schema version;
associating each group of elements in the data with an XML data description language conforming to the schema; and
presenting the data as an unbounded sequence of element groups.

5. The method of claim 1, wherein a change to any one service in the plurality of recipient applications does not necessitate changes to each of the other recipient application in the plurality of recipient applications.

6. The method of claim 1, wherein the message producer does not have pre-existing knowledge of supported data format or semantics of individual services in the plurality of recipient applications.

7. The method of claim 1, wherein each element in the unbounded sequence of elements is directed to be read by a different target application than the remaining elements in the unbounded sequence.

8. A system for sharing data across a plurality of services, said system comprising:
storage memory including one or more sequences of instructions; and
one or more processors of a message producer that execute said sequences of instructions to carry out the steps of:
determining data to be sent from said message producer to a plurality of recipient applications;

defining an extensible markup language (XML) schema that specifies an unbounded sequence of elements, wherein the unbounded sequence is extendable by adding new elements irrespective of existing elements in the unbounded sequence, wherein each element in the XML schema comprises a body of data and wherein each said element further identifies at least one schema used to process the body of data of said element;

composing a single message that conforms to the XML schema, wherein said one or more processors of the message producer organizes the data to be sent to the plurality of recipient applications as the sequence of said elements, each said element being intended for a particular recipient application and each said element identifying the schema intended for the particular recipient application;

broadcasting the single message from the message producer to the plurality of different recipient applications, each recipient application using a different data description language, wherein said each recipient application processes only the portion of the single message that contains the element intended for said recipient application by retrieving the schema associated with said element;

determining that at least one of the plurality of recipient applications has been modified to use a new data description language and receiving additional data to be transmitted to the modified recipient application, wherein said new data description language is unsupported by the XML schema;

modifying the XML schema to include said new data description language by including a new element that extends the unbounded sequence of elements of the XML schema, wherein the new element identifies a new schema that defines the types and semantics of the additional data contained in the new element and is compatible with said new data description language of said modified recipient application;

creating a second message that conforms to the extended XML schema, said second message including the additional data as said new element, wherein said new element describes said new schema and is compatible with said new data description language of said modified recipient application;

broadcasting the second message to the modified recipient and to the plurality of the recipient applications, wherein the plurality of recipient applications remain unaffected by the extension of the second message to include the new element and the new schema, wherein the modified recipient processes the new element of the second message by retrieving the new schema, and wherein each of the recipient applications receives the second message and processes only a portion of the elements of the second message that are intended for the particular recipient application; and creating and broadcasting one or more additional messages conforming to the extended XML schema to the plurality of recipient applications.

\* \* \* \* \*

UNITED STATES PATENT AND TRADEMARK OFFICE
CERTIFICATE OF CORRECTION

| | |
|---|---|
| PATENT NO. | : 7,908,291 B2 |
| APPLICATION NO. | : 11/054882 |
| DATED | : March 15, 2011 |
| INVENTOR(S) | : Sengupta |

It is certified that error appears in the above-identified patent and that said Letters Patent is hereby corrected as shown below:

In column 6, line 18, Delete "srtucture" and insert -- structure --, therefor.

Signed and Sealed this
Fourth Day of October, 2011

David J. Kappos
*Director of the United States Patent and Trademark Office*